Dec. 4, 1928.
H. W. HARRIGAN
1,693,649
METHOD OF AND APPARATUS FOR TREATING STARCH
Filed Nov. 5, 1927
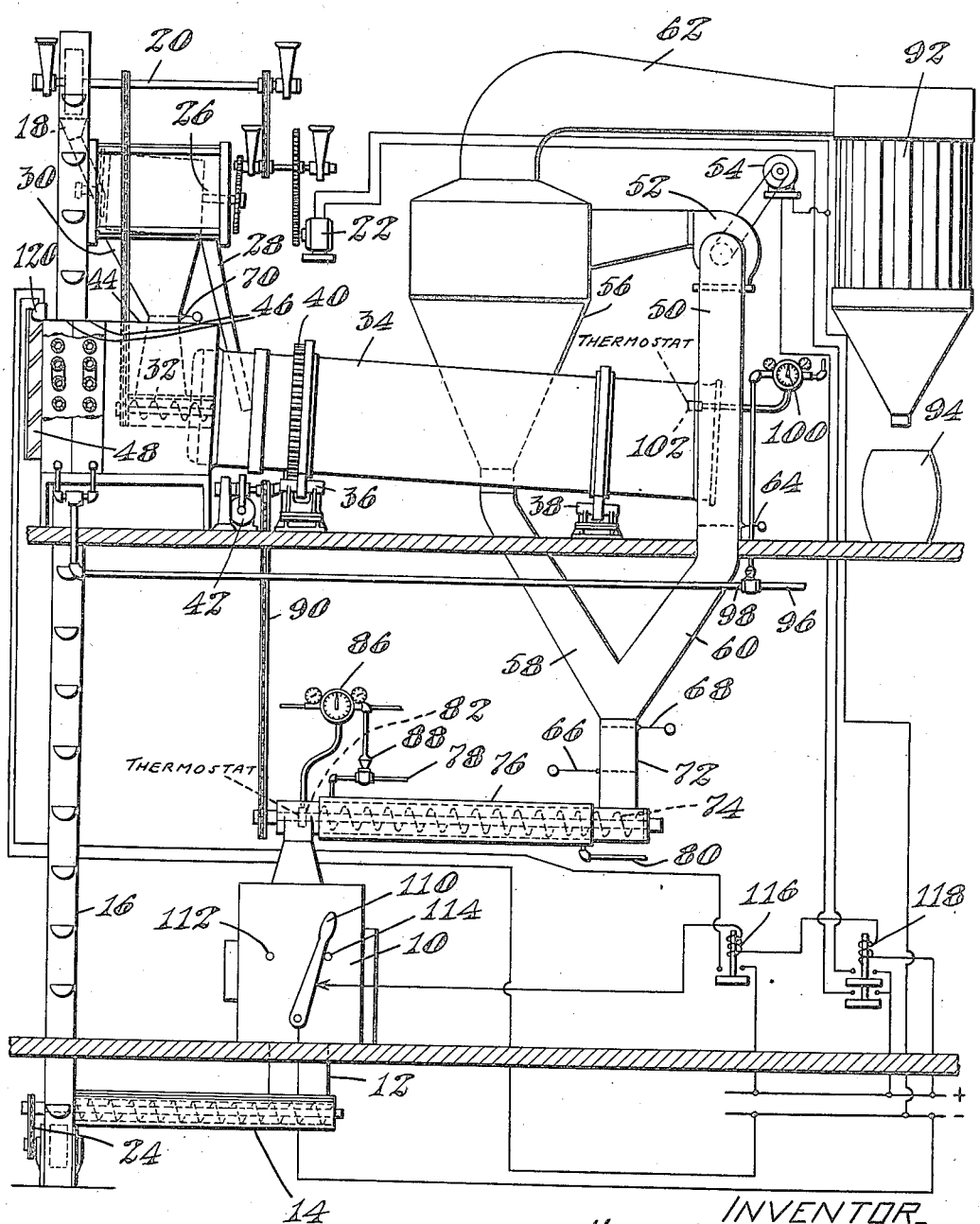
INVENTOR
Harold W. Harrigan
by his attorney
Myron M. Davis Patented Dec. 4, 1928.

1,693,649

UNITED STATES PATENT OFFICE.

HAROLD W. HARRIGAN, OF MEDFORD, MASSACHUSETTS, ASSIGNOR TO HERSEY MANUFACTURING COMPANY, OF SOUTH BOSTON, MASSACHUSETTS, A CORPORATION OF MASSACHUSETTS.

METHOD OF AND APPARATUS FOR TREATING STARCH.

Application filed November 5, 1927. Serial No. 231,297.

This invention relates to a method of and apparatus for treating pulverulent or granular material and is herein illustrated in connection with the reconditioning of molding starch which is used in the manufacture of certain kinds of confectionery such, for example, as marshmallows.

Although it will be understood that the method and apparatus are both applicable to various forms of pulverulent and granular material, the present description, for simplicity, will be confined to the utilization of the invention in connection with molding starch such as employed in providing molds for the setting of marshmallow paste to form individual candies without implying that the scope of the invention is necessarily so limited. In the manufacture of such candies, a shallow tray or starch board is filled with starch and provided with indentations or molds in which the candies are to be formed. A machine for this purpose is known either as a "starch buck" or as a "Mogul." Such a machine is arranged to fill the shallow trays and to print in them the indentations so that they may be used as molds. The marshmallow, in paste form, is then deposited in these indentations and the boards are stacked on tracks and transferred to a "setting up room" until the paste has "set" sufficiently to handle it. The stacks of starch boards or trays are then returned to the Mogul where they are emptied and the candies and the starch are separated by means of a coarse mesh vibrating screen, the starch being returned to the reserve bin in the bottom of the Mogul machine for reuse. Under normal conditions this cycle may only be repeated three or four times before the starch will become so laden with moisture that it is unfit for use and would spoil the product. In accordance with the practice heretofore followed, the trays are filled with starch by the Mogul machine and the molds impressed therein but are not immediately filled with paste by the "depositor"; instead, they are stacked on trucks and wheeled into a heated drying room where they remain for about twenty-four hours. The drying action in such rooms is not uniform and, in most cases, is insufficient and the starch coming from the drying room is of too high a temperature for immediate use for the reception of marshmallow paste and must be allowed to stand and cool. During this cooling process moisture is absorbed from the air, particularly on humid days. In many instances it is found impossible to operate the factory during the humid days of mid-summer with the arrangements heretofore provided.

Accordingly, one object of the present invention is to provide an improved method of treating starch and the like to bring it to the desired condition as respects temperature and moisture content whereby these conditions may be controlled with exactitude and marked economies of operation may be secured.

Still another object of the invention is to provide improved apparatus by means of which the starch may be progressively and continuously reconditioned and returned to the molding apparatus ready for reuse.

In accordance with a feature of the invention, the starch is dried by carrying it through a closed passageway by means of a current of heated air. The air is separated from the starch and the starch is returned to the source of supply, being cooled as it returns. In the illustrated arrangement apparatus is provided for conveying the starch from a source of supply such as the Mogul machine to a rotary sifter from the hopper of which it is transferred to one end of a passageway through which a current of heated air is passed. The starch is intermingled with this heated air in its movement through the passageway and the moisture is absorbed by the heated air. The starch is then separated from the current of air and is returned by means of another conveyor to the Mogul machine, means being provided to reduce the temperature of the starch as it is returned so that upon its redelivery to the Mogul machine it will be suitable for immediate reuse.

In accordance with still another feature of the invention, the bulk of the starch is separated from the current of heated air by imparting a whirling movement thereto and the residue of starch in the separated air is collected by means of a filtering device.

In view of the fact that the operation of a Mogul machine is never continuous, the operation of the treating mechanism should not be continued when there is no longer a supply of starch for it, and in accordance with still another feature of the invention an automatic control device is provided for making the control of various elements of the treating apparatus dependent upon the control of the Mogul machine.

These and other features of the invention will be more fully described and set forth in the accompanying specification taken in connection with the accompanying drawing, in which the single figure shows diagrammatically a treating mechanism and the driving and control devices utilized in connection therewith.

A machine for utilizing starch, which may be a Mogul machine such as has been previously described, is indicated at 10, and it will be understood that it is provided with a reserve bin (not shown) in which previously utilized starch is received and with another bin to receive reconditioned starch. Starch which has collected in the reserve bin is removed therefrom through a hopper 12 and a screw conveyor 14 and delivered to a bucket conveyor 16 by means of which the moist starch is elevated and dumped into a receiving spout 18. This bucket conveyor is driven from a countershaft 20 by means of a motor 22, and it will be noted that the screw conveyor 14 is connected to the bucket conveyor 16 by means of a driving chain 24 so that they operate together.

The receiving spout 18 leads the starch to the interior of a sifting drum 26 which is arranged to be also driven by the motor 22, and this sifting drum, which is set at a slight inclination, removes impurities from the starch, such as small pieces of wood or the like which may have been mingled with the starch, and discharges these impurities through a spout 28, The starch, on the other hand, passing through the screen of the rotary sifter 26 is deposited in a hopper 30 leading to a screw conveyor 32 by means of which it is removed from the bottom of the hopper and transferred to a drying cylinder 34. This drying cylinder may be of any well-known type and is herein illustrated as of the sort embodying an elongated drum rotatably supported upon rolls 36, 38 and driven through a gear 40 by means of another driving motor 42. This drying cylinder 34 may be, and usually will be, provided with internal vanes or blades (not shown) by means of which the enclosed starch is constantly agitated and tumbled over and over. It will be noted that the drying cylinder 34 is positioned at a slight inclination so that it tends of itself to cause a steady progress of the starch toward its right-hand end.

In order still further to facilitate the passage of the starch through the drying cylinder 34 and at the same time to absorb some of the moisture in the starch by means of a drying medium intermingled therewith, means are provided for passing a current of heated air through the passageway provided by this elongated drying cylinder 34. Accordingly, an entrance chamber 44 is provided with spaced heating coils 46 at the entrance to which are mounted shutters 48. At the same time the right-hand end of the drying cylinder 34 is connected with a vertical passage 50 leading to a suction fan 52 driven by means of a motor 54. The revolving dryer tumbles the starch through this current of air to mingle them. The outlet of the fan 52 is connected to a separator 56 of the cyclone type embodying a conical housing into which the air current is admitted tangentially near its upper end. The lower end of the separator is connected to a pipe 58 joining a similar pipe 60 leading from the vertical passage 50. The air which is separated from the starch in the separator 56 passes out at the top of the separator through a pipe 62, and the starch which is whirled around gradually falls out of the current of air, because of its greater weight, into the pipe 58. Any starch which is emptied by the drying cylinder into the passageway 50 in such a form that it is not comingled with the air drops directly through the pipe 60 to join that coming down through the pipe 58. In order to prevent the admission of air to the drying cylinder through anything except the entrance chamber 44 with its heating coils 46, counterweight dampers 64, 66, 68 and 70 are provided at various points and these dampers exclude all air from the system except that which has passed through the heating coils 46. As the dried starch drops through the pipes 58 and 60 into the pipe 72, it is removed therefrom by means of a screw conveyor 74 which returns it to another bin of the Mogul machine. Because of the fact, however, that the temperature of the starch has been raised very considerably during the drying process, it would not be fit for immediate reuse by the Mogul machine were it not for the fact that a cooling device is provided in the form of a packet 76 to which a cooling medium such as water, brine, or the like, may be introduced through a pipe 78 and may flow out through a pipe 80. The temperature of the outgoing starch is maintained substantially constant by inserting a thermostat 82 is the outlet of the screw conveyor 74 and providing an automatic control device 86 of well-known form to operate a diaphragm valve 88, thereby to control the passage of the cooling medium through the jacket 76. The screw conveyor 74 is driven by the motor 42 by means of a chain 90.

The moist air which passes out through the pipe 62 is found to carry along with it a small amount of starch in the form of very fine dust which has not been separated from the air by means of the cyclone device 56. Consequently, this air is passed through a filtering device in the form of a cloth tube separator 92 of well-known form, and the residue of starch which is separated from the air by means of this filtering device 92 is deposited in a suitable receptacle 94.

Inasmuch as it is well recognized that uniformity in the temperature and moisture content of the treated starch are of the utmost importance in the manufacture of molded marshmallow candies, a control device is provided for the heating coils. Hot fluid, such as steam, is supplied to these heating coils 46 through a pipe 96, and a diaphragm valve 98 is inserted in this pipe which is operated automatically by a mechanism 100 controlled by a thermostatic couple 102 inserted in the passage of the drying cylinder 34 and hence responsive to the temperature of the heated air and starch leaving the dryer.

Since the operation of the Mogul is never continuous, it is desirable, in order to have a uniform product, to have the treating apparatus automatically controlled in synchronism with the control of the Mogul machine, so as to have the temperature and the flow of starch always under control. Accordingly, the Mogul machine 10 is indicated as being provided with a control lever 110 movable between two stops 112 and 114. When the lever 110 is in contact with the stop 114 it is in position to set in operation the Mogul machine, and in this position it is effective to control the operation of the treating apparatus through the use of suitable electrically operated relay switches 116 and 118. By means of the relay switch 116 a motor valve 120, which is arranged to operate the dampers 48, is so controlled that when the Mogul machine is operating the dampers are held open but when the Mogul machine is shut down the dampers are closed to prevent the admission of air into the drying cylinder 34. The other relay switch 118 is arranged to control the supply of current to the motors 22 and 54. As a result, when the Mogul machine is stopped by swinging the lever 110 against the stop 112, the motors 22 and 54 stop, leaving only the dryer and the cooler conveyor 74 rotating. Inasmuch as the dampers 48 have been closed by the operation of the other relay 116, there will be a consequent rise of temperature which will force the thermostat 102 through the operating device 100 to close the diaphragm valve 98 to stop the supply of steam or other heating fluid through the pipe 96. At the same time the stopping of the motor 22 will stop the operation of the conveyors 14, 16 and 32. This arrangement absolutely prevents the starch from accumulating at any point to jam and break any part of the apparatus and insures that the small amount of starch remaining in the dryer will not be dried to a greater extent than the balance of the run of starch passing through the system.

It is believed that the operation of the apparatus and the method of treating the material will be obvious from a consideration of the preceding description. Accordingly, having thus described my invention, what I claim is:

1. The improvement in the method of treating granular material which consists in sifting the material to remove impurities therefrom, drying the material by the application of heated air, and separating the material from the air.

2. The improvement in the method of treating granular material which consists in sifting the material to remove impurities therefrom, drying the material by the application of heated air, separating the material from the air, and cooling the separated material.

3. The improvement in the method of treating moist granular material which consists in mingling the material with a heated medium to remove the moisture from the material by absorption, thereby increasing the temperature of the material, and in then cooling the material to bring its temperature back to a point where it is fit for immediate reuse.

4. The improvement in the method of treating moist granular material which consists in mingling the material with a heated medium to remove the moisture from the material by absorption thereby increasing the temperature of the material, separating the dried material from the heated absorption medium, and in then cooling the material to bring its temperature back to a point where it is fit for immediate reuse.

5. The improvement in the method of treating molding starch which consists in sifting the starch to remove impurities therefrom, drying the starch by intermingling it with heated air, separating the starch from the air, and cooling the starch to reduce its temperature to a point where it will be ready for immediate reuse.

6. The improvement in the method of treating moist molding starch which consists in taking starch from a source of supply, drying the moist starch by tumbling it through a current of hot air as the starch is moved steadily forward, and cooling the starch while it is being returned to the source of supply.

7. The improvement in the method of continuously treating molding starch which has become too moist for further use in the molding machine, which consists in elevating the starch, allowing it to move partly by gravity through a rotary drying device, and in conveying the dried starch through a cooling device thereby to return it to its source in a dried and cooled condition.

8. The improvement in the method of continuously treating moist molding starch which consists in conveying the starch from one point to another by means of a current of heated air thereby to dry the starch, and then returning the starch to the point of use by conveying it through a cooling device to reduce its temperature to a point where it will be ready for immediate use.

9. The improvement in the method of continuously treating starch or the like after it has been used for molding confectionery to bring it to a condition where it will be ready for reuse, which consists in drying starch taken from a source of supply by the action of a current of hot air, moving the starch to another point partly by the force of the current of air, separating the bulk of the starch from the air current by imparting a whirling movement thereto, and removing the residue of starch from the air current by an air filter.

10. The improvement in the method of continuously treating starch or the like after it has been used for molding confectionery to bring it to a condition where it will be ready for immediate reuse, which consists in drying starch taken from a source of supply by the action of a current of hot air, moving the starch to another point partly by the force of the current of air, separating the bulk of the starch from the air current by imparting a whirling movement thereto, removing the residue of starch from the air current by an air filter, and cooling the bulk of the starch as it is returned to the source of supply.

11. An apparatus for the progressive and continuous treatment of starch or the like comprising an inclined rotary drying cylinder, means for elevating the starch from a source of supply and dumping it in said cylinder to allow it to pass through said cylinder partly by the action of gravity to dry it, a cooling device, and means for conveying the dried warm starch through said cooling device and returning it to the source of supply.

12. An apparatus for the progressive and continuous treatment of starch or the like comprising a drying apparatus, means for transferring the starch from a source of supply to said drying apparatus, means for causing a current of heated air to pass through said apparatus thereby to dry the starch and move it along to another position in the system, a separator for removing the starch from the heated air, and a cooling device through which the dried starch is passed for return to the source of supply.

13. An apparatus for the progressive and continuous treatment of starch or the like comprising a rotary dryer in the form of an elongated cylinder having vanes, means for transferring the starch from a source of supply to the mouth of said dryer, means for causing a current of heated air to pass through said dryer, means for rotating the dryer to intermingle the starch with the current of air, a separator for removing the starch from the heated air, and a cooling device through which the dried starch is passed for return to the source of supply.

14. An apparatus for the progressive and continuous treatment of starch or the like comprising a rotary dryer in the form of an elongated cylinder having vanes, means for transferring the starch from a source of supply to the mouth of said dryer, an entrance chamber at the mouth of said dryer, spaced heating means in said chamber, means for causing a current of air to pass through said heating means and thence through said dryer, means for rotating the dryer to tumble the starch through the current of heated air, a centrifugal separator for removing the starch from the heated air, a conveyor to return the dried starch to the source of supply, and a cooling jacket surrounding said conveyor.

15. An apparatus for treating starch or the like comprising a rotary sifting drum, means for transferring starch from a source of supply and dropping it into said sifting drum, a hopper for receiving the starch from said sifter, a drying passage, means for causing a current of heated air to move through said passage from a point adjacent to the hopper to a more distant point, means for removing the starch from the hopper and dropping it into said current of heated air, means for separating the starch from the current of air, a conveyor for transferring starch from said separator to the source of supply, and means for cooling the starch during its progress through said conveyor.

16. An apparatus for treating molding starch comprising a passageway, a heating device adjacent to one terminal of said passageway, means for delivering starch to the passageway adjacent to said heating device, a suction fan for setting up a current of air through the heating device and the passageway thereby to carry along the starch and simultaneously to dry it, means for separating the starch from the air, means for delivering the separated starch to the source of supply and cooling it as it is so delivered, and means for preventing the admission of air to said passageway except through said heating device.

17. In combination, a machine for molding starch containing a receptacle for the starch which has been previously used, an apparatus for progressively and continuously removing moist starch from said apparatus and returning it thereto after treatment to remove the moisture, said apparatus embodying rotary conveying and treating mechanisms, and means for rendering the control of said mechanisms dependent upon the control of the molding machine to the end that the action of the treating mechanism and of the molding machine will be substantially synchronized.

18. In combination, a machine for molding starch containing a source of starch supply and a source of used starch unfit for immediate reuse, a treating apparatus for progressively and continuously removing said unfit starch, drying it cooling it and returning it to the molding machine, comprising apparatus for setting up a current of heated air, and means for rendering the control of said apparatus for producing the current of heated air dependent upon the control of the starch molding machine.

19. In combination, a starch molding machine, an apparatus for treating the starch used by the molding machine comprising a passage for a current of heated air, shutters controlling said passageway, and automatic means for controlling the position of said shutters in response to the action of the operator in controlling said molding machine.

20. In combination, a machine for utilizing molding starch and an apparatus for drying starch used in the machine and returning it thereto, said apparatus comprising a passageway, means for moving a current of heated air through said passageway, means for controlling the air entrance to the passageway, and controlling devices for shutting said entrance and stopping the current of air when the aforementioned machine is stopped.

In testimony whereof I have signed my name to this specification.

HAROLD W. HARRIGAN.